United States Patent [19]

Haneji

[11] Patent Number: 5,124,962
[45] Date of Patent: Jun. 23, 1992

[54] READING SYSTEM FOR A CONTROL TRACK OF AN OPTICAL DISK

[75] Inventor: Yasuo Haneji, Aikawa, Japan

[73] Assignee: Victor Company of Japan, Ltd., Yokohama, Japan

[21] Appl. No.: 442,716

[22] Filed: Nov. 29, 1989

[30] Foreign Application Priority Data

Nov. 30, 1988 [JP] Japan ................... 63-303038

[51] Int. Cl.$^5$ ............................................. G11B 7/12
[52] U.S. Cl. ........................................ 369/32; 369/54; 369/44.34; 369/44.11; 369/44.28
[58] Field of Search ............... 369/44.11, 44.26, 44.34, 369/44.27, 44.35, 44.32, 44.41, 44.25, 44.29, 54, 58, 32, 47, 59, 50; 360/77.05, 77.06; 358/342, 907

[56] References Cited

U.S. PATENT DOCUMENTS

| | | | |
|---|---|---|---|
| 4,924,455 | 5/1990 | Fujiie et al. | 369/44.11 |
| 4,982,392 | 1/1991 | Soejima | 369/44.35 |
| 5,023,855 | 6/1991 | Kobayashi et al. | 369/44.28 |
| 5,038,334 | 8/1991 | Uchikoshi et al. | 369/44.34 |

Primary Examiner—Roy N. Envall, Jr.
Assistant Examiner—Hung Dang
Attorney, Agent, or Firm—Fleit, Jacobson, Cohn, Price, Holman & Stern

[57] ABSTRACT

The control track of the optical disk is scanned by an optical pick-up. Data and clock are detected from the signal obtained by above scanning, and the missing state of the clock is further detected. In addition, the shifting direction relative to the control track of the optical pick-up is detected. When data indicates an error and the clock includes a large missing portion, the optical pick-up is shifted in a direction opposite to the shifting direction thereof. In the case where there is no shifting direction signal, the optical pick-up is shifted in a fixed direction. Such an operation is repeated until no shift is detected. In an alternative implementation, the control track of the optical disk is scanned by the optical pick-up. Data and clock are detected from the signal obtained by above scanning, and the missing state of the clock is further detected. When data indicates an error and the clock includes a large missing portion, the optical pick-up is shifted in a fixed direction. Thereafter, the width of the missing portion of the clock is detected. The optical pick-up is shifted in a direction opposite to the above when the missing width is widened and in the same direction as the above when the missing width is narrowed. Such an operation is repeated until no shift is detected.

18 Claims, 10 Drawing Sheets

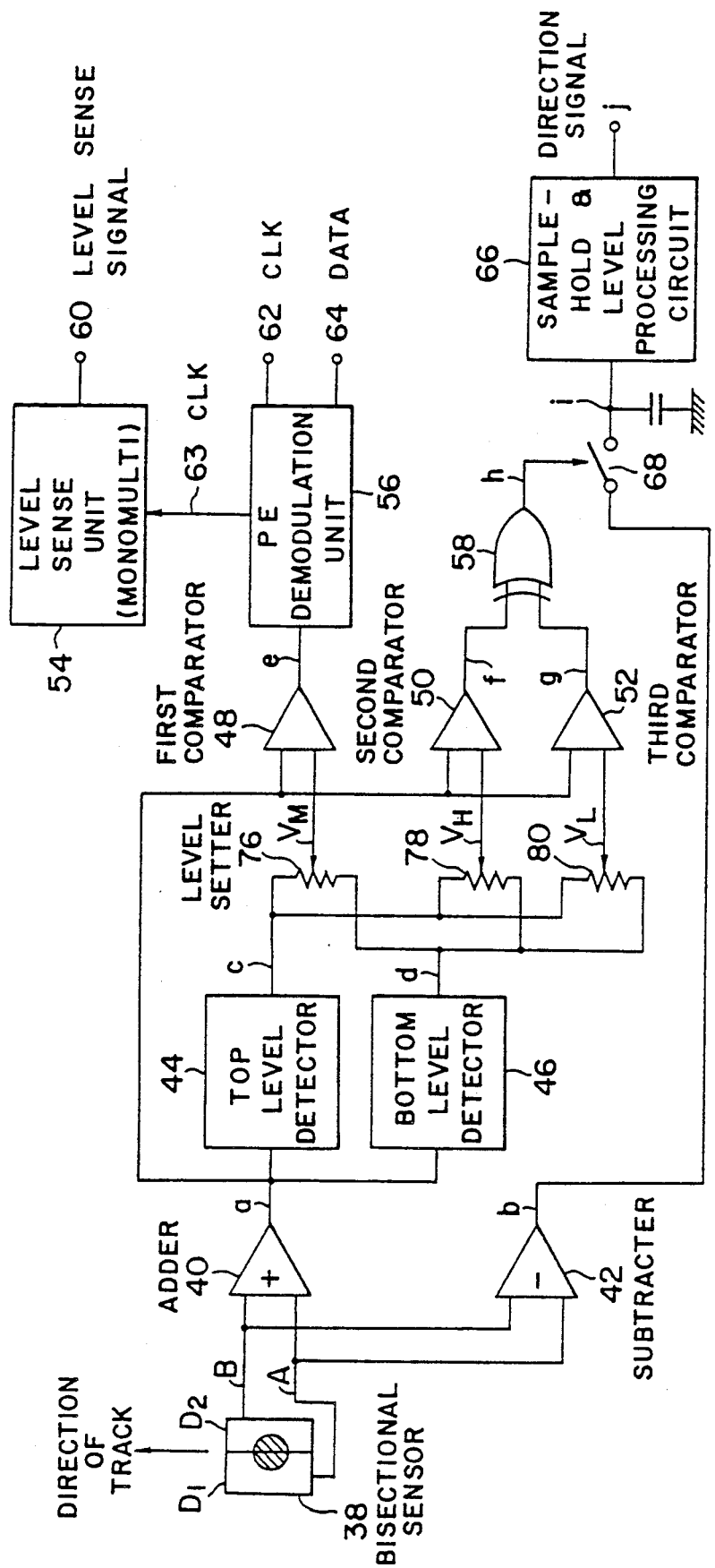
F I G. 1

READING SYSTEM FOR A CONTROL TRACK OF AN OPTICAL DISK

FIELD OF THE INVENTION

This invention relates to an optical disk reading system, and more particularly to an optical disk reading system suitable for use in conducting readout from a control track at the time of initial starting of an optical disk of the ISO standard.

BACKGROUND OF THE INVENTION

For optical disks, various material and systems have been conventionally developed, and further development of new materials and systems is expected. Accordingly, it is required that optical disks to be developed can be used compatibly with various optical disks including ones may be developed in future. For this reason, it is recommended to record the informations required for the reproducing apparatus onto respective disks. Such a pre-recorded region is a PEP (Phase Encoded Part) as described later in detail and is provided on the innermost circumferential portion of the disk.

The recording content of the PEP is, e.g., data coding format, tracking servo format, error correction code, light reflection coefficient on the reference plane, kind of medium, information for initially setting the reproducing apparatus such as the maximum value of the light beam at the time of reproduction, and CRC (Cyclic Redundancy Check) data for checking whether or not data obtained by reading such information is correct. They are recorded in accordance with a predetermined format.

In using disks, it is required to first read this portion to initially set the reproducing apparatus so that it is in an optimum state in conformity with the disk specification thereof. However, it is impossible to know the recording system until such a portion is read out. For this reason, there is employed a recording structure such that readout operation is possible even in the state where no tracking servo is applied to the reproducing apparatus (as a matter of course, there is some eccentricity). However, under the circumstances of actual use, the influence of dust or scratches on the disk surface would be anticipated (see "Collected Materials at Optical Disk Society Meeting in 1987" March, 1987, Society of the promotion for optical industrial technology).

FIG. 6 is an explanatory view of the format of a direct read after write (DRAW) optical disk. An example in conformity with the ISO standard is illustrated. As shown in this figure, each area in a radial direction of the optical disk 2 is divided according to use. Roughly, this area is divided into the control track area and the user area 12. A range of a radius of 30 to 60 mm is allotted to the user area 12, and various control tracks are arranged in other areas of a radius 29 to 30 mm and a radius of 60 to 60.5 mm. Namely, the PEP area 4 is arranged in the range of 29 to 29.5 mm, a SFP transition area 6 is arranged in the range of 29.5 to 29.52 mm, a SFP area 8 is arranged in the range of 29.52 to 29.7 mm, a medium manufacturer's area 10 is arranged in the range of 29.7 to 30 mm, and an external circumferential SFP 14 is arranged in the range of 60.15 to 60.5 mm. In this example, the control track area is composed of the PEP area 4 recorded in accordance with the format capable of reading by all drivers irrespective of the servo format of the optical disk, and a SFP area 8 recorded in accordance with the same format as that of the user area 12.

The information written into the PEP is information for setting the drive condition of the optical disk so that the SFP can be read.

A disk player serving to record information onto such an optical disk or reproduce them therefrom, first obtains control information such as the effective surface, or the range of reflection coefficient, etc. by the discriminator of the cartridge for accommodating the optical disk to read the PEP area 4 after setting of the control. In the PEP area 4, information such as the servo system, rotation mode, modulation system, ECC (error correction code), sector size, coefficient of reflection, signal polarity level, land/groove, reading power, media type, etc. are described. The disk player judges, on the basis of the above information, whether or not an optical disk can be use d f or recording/reproduction, and when it is judged that the optical disk concerned can be used, the disk player carries out setting of the operation by this control information. In order that these information can be read by players of any type, data are recorded, in accordance with the phase modulated format, by pits called ISO pits having a narrow pitch of about $1\mu$ independent of the servo system and the land/groove system.

FIG. 7 is a block diagram showing an outline of a conventional apparatus for reading the optical disk of the format shown in FIG. 6. As shown in this figure, an optical disk 2 is rotationally driven by a spindle 16. At the same time, read operation of information on the optical disk 2 is conducted by an optical pick-up 18. The positional control in a radius direction of the optical disk 2 is carried out by moving the optical pick-up 18 at a high speed by means of a linear motor 20. In addition, a fine positional control of the optical pick-up 18 is carried out by delivering, to the linear motor 20, a linear motor control signal (pulsated drive signal) output from a control unit 24.

The linear motor 20 is identically considered as a d.c. motor. When the linear motor 20 is driven a double or bipolar pulse waveform as shown in FIG. 8(a), a velocity v of the optical pick-up 18 such that acceleration/deceleration can be smoothly conducted is provided as shown in FIG. 8(b). As a result, the optical pick-up 18 can be stopped under the state of displacement x as shown in FIG. 8(c). Accordingly, minute or fine positional alteration of the optical pick-up 18 can be carried out by applying a pulse to the linear motor as a linear motor control signal 36.

The alteration sequence of the read area briefly referred to the above will be now described in detail with reference to FIG. 9.

Initially, positioning of the optical pick-up is mechanically completed by the inner circumferential position sense switch 32 of FIG. 7 (S11). Then, the PEP signal is read (S12) and the CRC error is checked (S13). When the error is detected, there will be two cases. First case is that the read position is in correct, and is thus positioned at the boundary of the PEP area. Second case is that the read position is correct. In the first case, since the level signal is detected (S14), the process shift to a limit control operation for returning from the boundary area (S15). In the second case, since it is considered that the read position is not beyond the PEP area, but error occurs by small defect, etc., it is sufficient to slightly alter or change the read position. The alteration method is carried out by applying a pulse to the linear motor as shown in FIG. 8. As an example, such a method to move the read position in an outer circumferential direction step by step is used. This method corresponds to the fine adjustment of position of the flowchart in FIG. 9 (S16). After that operation, an operation sequence follows to carry out read operation of the PEP for a second time (S12) to carry out checking of the CRC error.

Furthermore, in order to allow the light beam from the optical pick-up 18 to be positioned in the control track PEP area 4 on the inner peripheral side of the optical disk 2, inner circumferential position sense switch 32 is provided. By inputting, to the control unit 4, an inner peripheral position sense signal 34 that is output from the inner circumferential position sense switch 32, a linear motor control signal 36 is output to move the linear motor 20. Thus, positioning of the optical pick-up 18 is carried out.

A read signal 18A from the optical pick-up 18 is input to the signal sense unit 22. A signal in the control track PEP area 4 is written three times with one round being divided into three sectors. For a demodulated signal thereof, a direction signal 28 and a level sense signal 30 are included in addition to a data signal 26. On the basis of these signals, the control unit 24 conducts a tracking control in reading data in the PEP area 4 and in reading data in the user area 12 through the linear motor control signal 36.

The PEP area 4 has a width of 500μ in a radial direction. Since the specification of eccentricity of the optical disk 2 is 50μ the signal can be satisfactorily read as long as all standards are completely satisfied.

As stated above, the PEP area 4 of the optical disk 2 is recorded onto the portion of 29.0 to 29.5 mm in the vicinity of the inner most circumference of the optical disk 2. This area 4 is formed so that off track reading, i.e., reading system capable of effecting read operation can be implemented with a pitch narrower than an ordinary track pitch called an ISO pit within the width of 500μ. Since an allowed quantity of eccentricity of the optical disk 2 is determined to fall within 50μ as required by the standard, if a control can be conducted such that the innermost circumferential position of the optical pick-up 18 is correctly equal to 29.25 mm, a track of 500μ in width can be precisely read without any problems. This innermost circumferential position is sensed by the inner peripheral position sensor switch 32.

Since the conceivable disk read position control is conducted as above, there are problems as described below.

In order to precisely read the PEP area 4 on the optical disk 2, it is required to effect control such that the innermost circumferential position of the optical pick-up 18 is precisely equal to 29.25 mm. The positioning accuracy at this time all depends upon the sense accuracy of the inner circumferential position sense switch 32. In addition, it is required that the accuracy in the positional control of the optical pick-up 18 is maintained at all times. For this reason, as the inner circumferential position sense switch 32, it is necessary to use a switch having a high sense resolution and a less change with the lapse of time. Further, in the case of using a switch which is simply turned on or off at the sense position, such an adjustment is very troublesome. Namely, the problem that cost is extremely increased results.

In reading the PEP area 4 of the optical disk 2, it is inevitable that inconvenience in read operation occurs in practice by the reproducing condition and the optical disk 2. As a result, error in reading data may occur by the failure of the signal read operation, etc. In this case, it is required to conduct control to alter the read position on the optical disk 2 to retry another read operation. In such a case, since the PEP area 4 has a broad width and the read operation is conducted on a narrow track, there is the problem that tracking control by the track cross signal cannot be carried out.

On the other hand, it is proposed to use a switch capable of sensing position with a high resolution as the position sense switch 32. However, when such a switch is employed, there is the problem that not only the merit obtained with the direct access for conducting a tracking control only by the track cross signal in the case of providing an access to the user area 12 is reduced, but also the cost is extremely increased by the necessity of using an external scale.

SUMMARY OF THE INVENTION

This invention has been made in view of the above, and its object is to provide an optical disk reading system which can stably conduct reading operation of the control track even without using a high accuracy position sense switch which is expensive and troublesome to mount.

In this invention, when the optical pick-up means shifts relative to the control track, whether the optical pick-up means positions to the inner circumferential side or to the outer circumferential side in a radial direction of the optical disk is determined by the shifting direction sense means. When the error detection means provides an output indicative of error, the control signal output means applies a control signal corresponding to the shifting direction to the transfer means. Thus, the optical pick-up is finely adjusted. This operation is repeated until the error is eliminated.

Furthermore, in this invention, when the error sensor means indicates error and the clock includes any missing portion due to the fact that the optical pick-up means shifts relative to the control track, a control signal from the control signal output means is applied to the transfer means, to thus finely adjust the optical pick-up means in one direction. After that, the width of a missing portion of the clock is detected. A control signal for adjusting the optical pick-up means so that it is directed in the same direction as the previous one when the width of the missing portion is narrowed and is directed in a direction opposite to the previous one when the missing width is widened is applied from the control signal output means to the transfer means. The fine adjustment of the optical pick-up means due to the application of the control signal is repeated until no missing portions are detected.

In accordance with this invention, it is possible to securely and stably read information of the control track of the optical disk.

BRIEF DESCRIPTION OF THE DRAWINGS

In the accompanying drawings:

FIG. 1 is a block diagram showing an optical disk reading system of a first embodiment according to this invention;

DESCRIPTION OF THE PREFERRED EMBODIMENTS

Preferred embodiments will be described with reference to the attached drawings.

Figure 9:
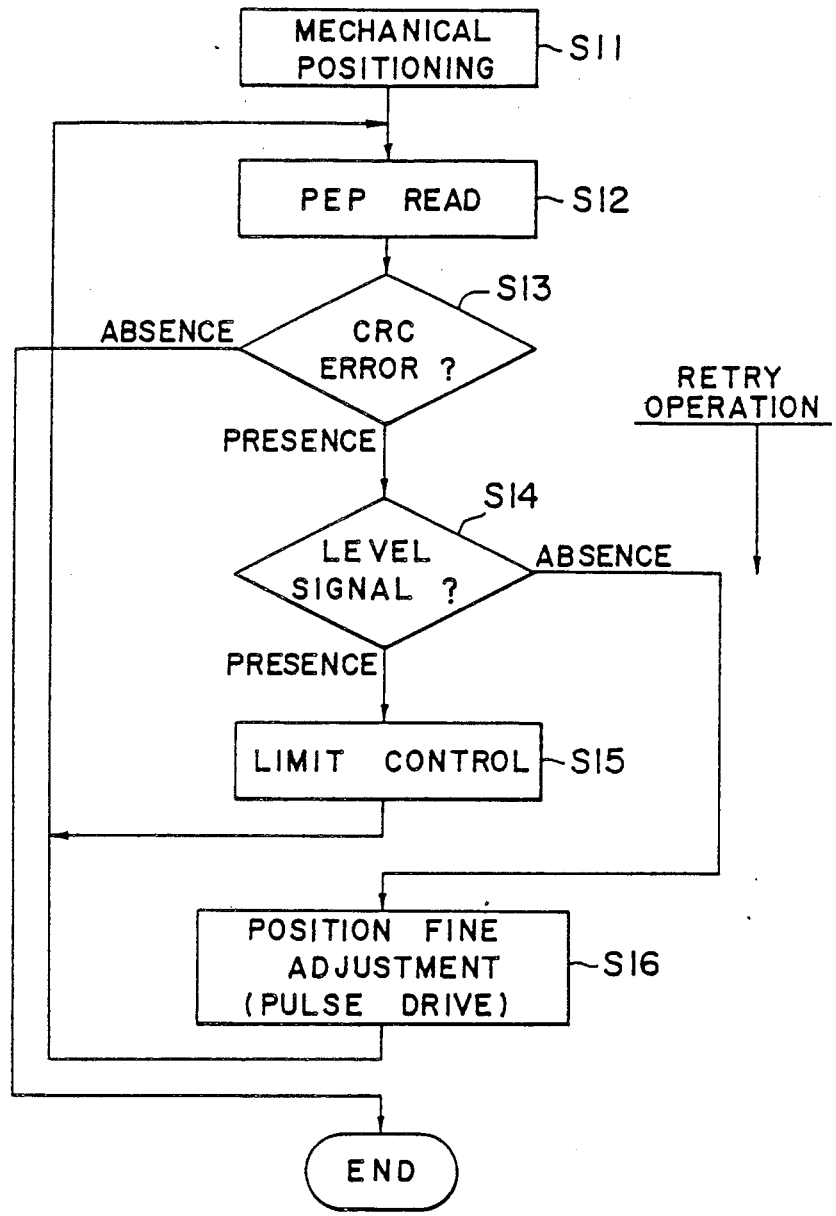
FIG. 9 is a flowchart showing the alteration sequence of the read area.

FIG. 1 is a block diagram showing a system configuration for realizing a disk read position control method according to a first embodiment of this invention. This reading system operates in accordance with the flow chart shown in FIG. 9. In FIG. 1, a bisectional sensor 38 is assembled into an optical pick-up 18, and is composed of two sensors $D_1$, $D_2$ divided or bisected along the track running direction. An output signal A from the sensor $D_1$ and an output signal B from the sensor $D_2$ are input to an adder 40 and a subtracter 42, respectively. As a result, a read out signal a read by the bisectional sensor 38 is obtained from the adder 40, and a polarity signal b which is the difference between read signals in a tracking control direction is obtained from the subtracter 42. This read out signal a is delivered to a top level detector 44 and a bottom level detector 46. Thus, a top level detection signal a which corresponds to the maximum level of the signal and a bottom level detection signal d which corresponds to the minimum level of the signal are obtained. The top level detection signal and the bottom level detection signal d are delivered to three level setters 76, 78, 80, and are converted to level signals $V_M$, $V_H$, $V_L$ of a specific rate which is intermediate between the top level detection signal c and the bottom level detection signal d, respectively. These signals are input, as comparison reference signals to a first comparator 48, a second comparator 50, and a third comparator 52, respectively. Thus, a first deviation signal e which is the output from the first comparator 48 is input to a PE (Phase Encode) demodulation unit 56, at which the signal e is demodulated in accordance with a predetermined demodulating procedure, then, clock signals 62, 63 and a data signal 64 are obtained.

Figure 10:
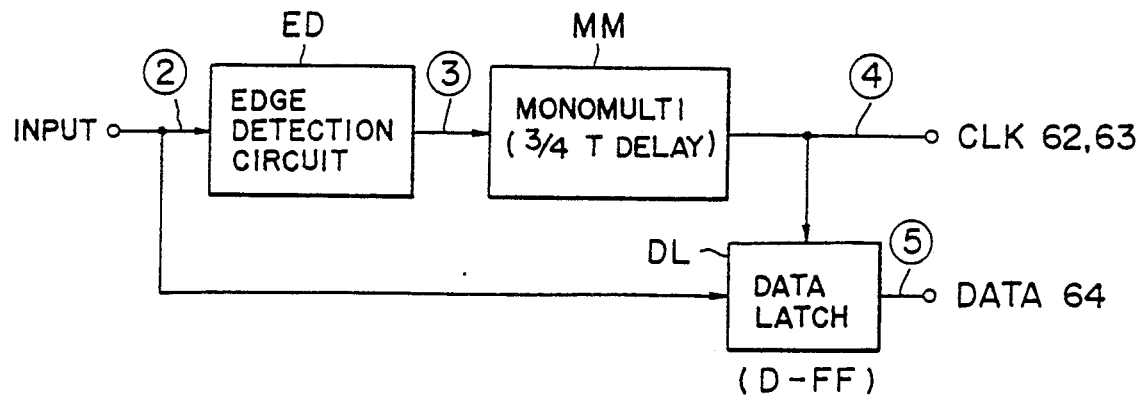
FIGS. 10 and 11 show an example of an actual circuit of the PE demodulation unit, and a timing chart of an example of the demodulating operation carried out by the PE demodulation unit, respectively.
Figure 11:
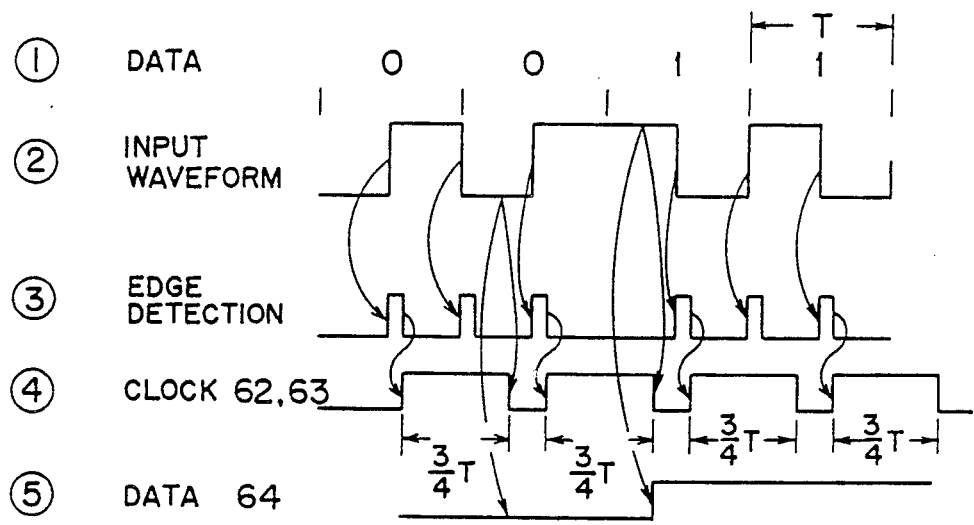

FIG. 10 shows an example of an actual circuit of the PE demodulation unit 56. An example of the PE demodulation is shown in FIG. 11. An input signal ② having data ① is applied to the edge detection circuit ED and the data latch (D-FF) DL. The edge detection signal ③ is obtained from the edge detection circuit ED, and is applied to the mono multivibrator MM having a ¾ T delay. A clock 62 is obtained from the monomultivibrator MM and is applied to data latch DL. Thus, data ⑤ is obtained from the data latch DL.

On the other hand, a second deviation signal f which is the output from the second comparator 50 and a third deviation signal which is the output from the third comparator 52 are input to an Exclusive OR circuit 58. Thus, a difference component signal h given by the exclusive OR of the both signals is output. This difference component signal h is used for opening and closing a switch 68 which allows the polarity signal b from the subtracter 42 to be turned on and off. A PEP area boundary signal i obtained through the switch 68 is input to a sample-hold & level processing circuit 66, at which a direction signal j is obtained.

Figure 4A:
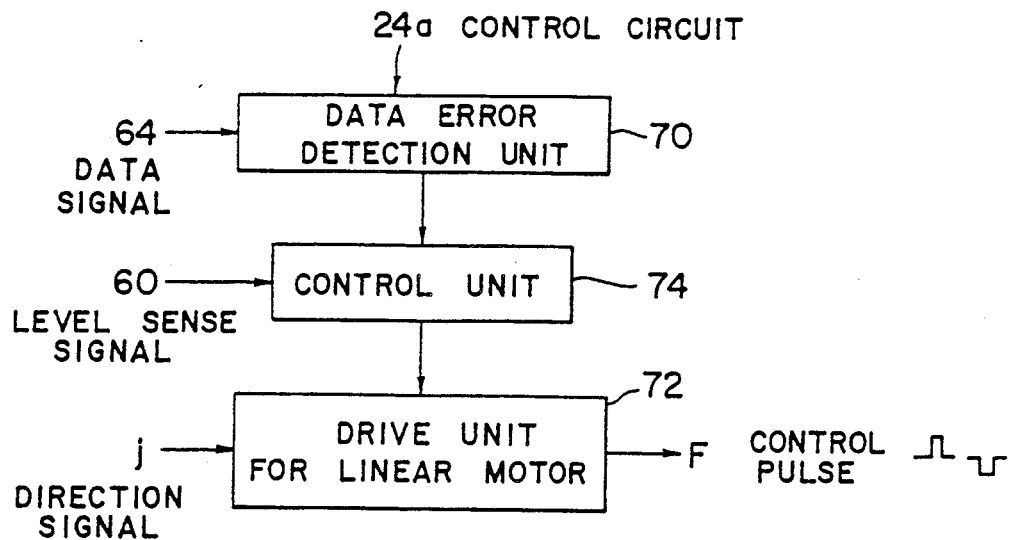
FIGS. 4A and 4B are block diagrams of a control circuit applied to first and second embodiments of this invention.
Figure 7:
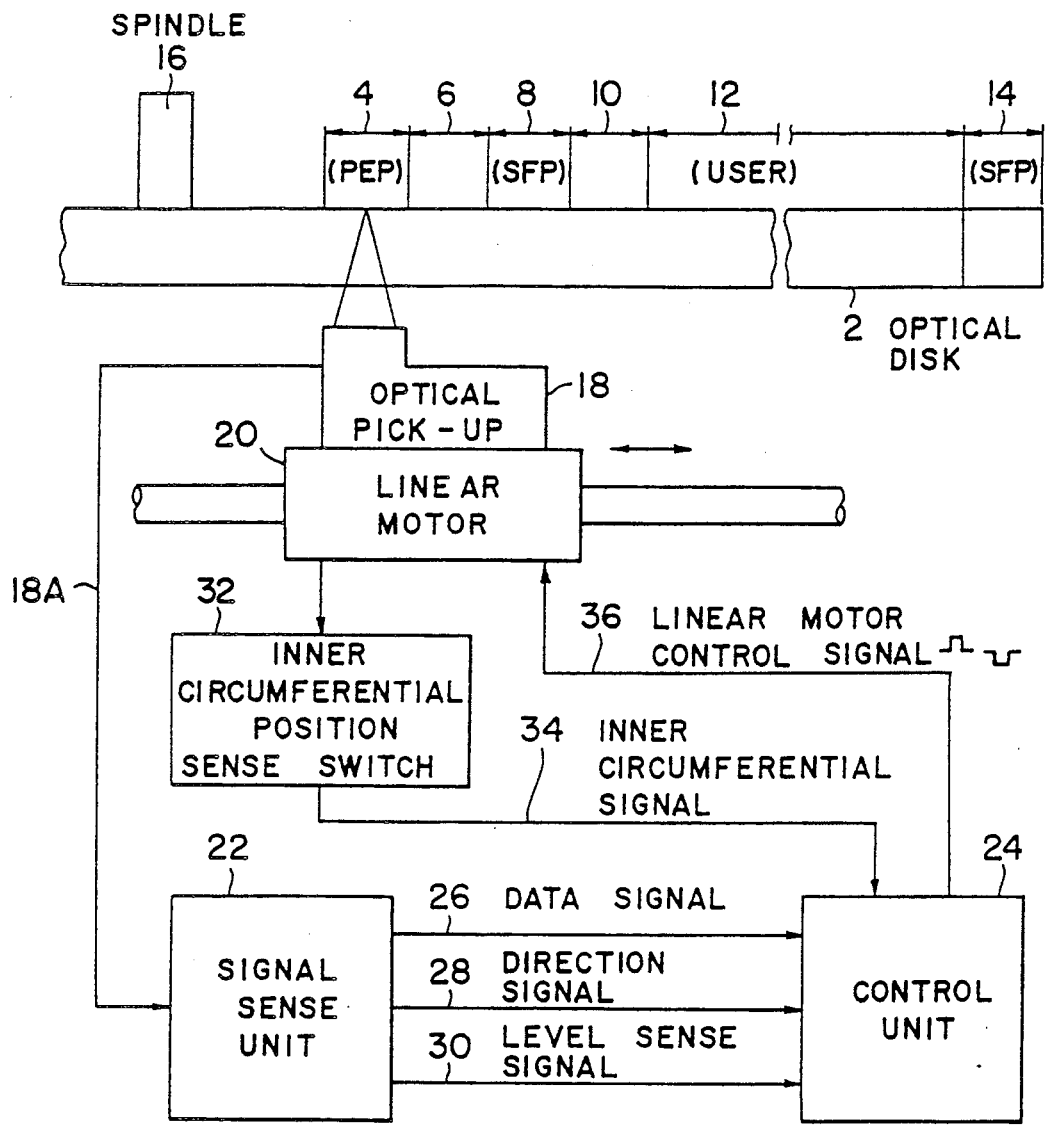
FIG. 7 is a block diagram showing an outline of a conceivable optical disk reading system.
Figure 8:
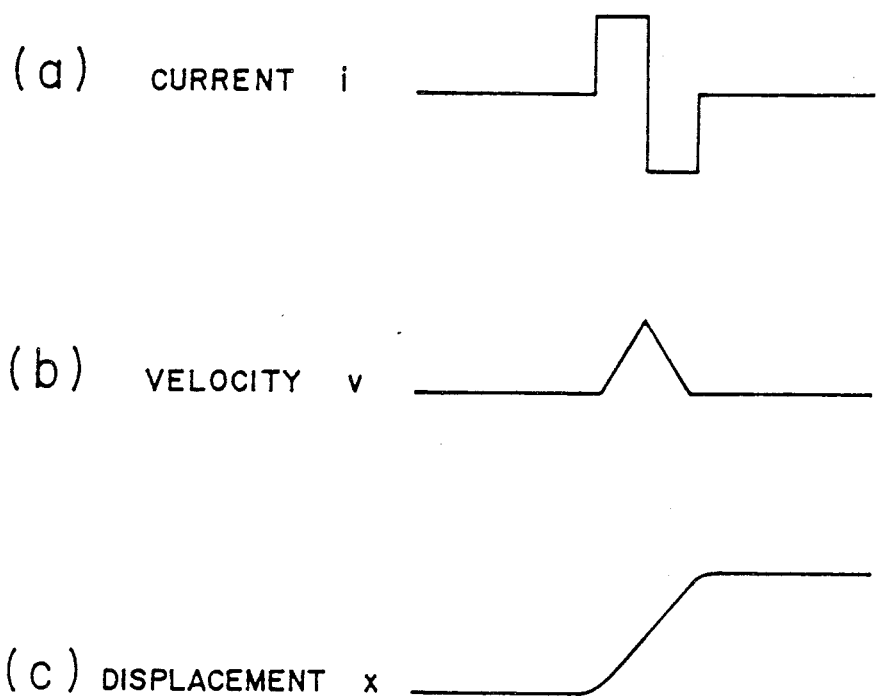
FIG. 8 is an explanatory view of a fine displacement control by the linear motor.

A data signal 64 which is the output signal from the PE demodulation unit 56, a level sense signal 60 which is the output signal from the level sense unit 54, and a direction signal j which is the output signal from the sample-hold & level processing circuit 66 are delivered to a control circuit 24a (corresponding to the control circuit 24 in FIG. 7) as shown in the block diagram of FIG. 4(A). This control circuit 24a is composed of a data error detection unit 70, a control unit 74, and a drive unit 72, and outputs a control pulse F to the linear motor 20 for carrying out the positional control in a tracking direction of the optical pick-up 18.

Figure 2:
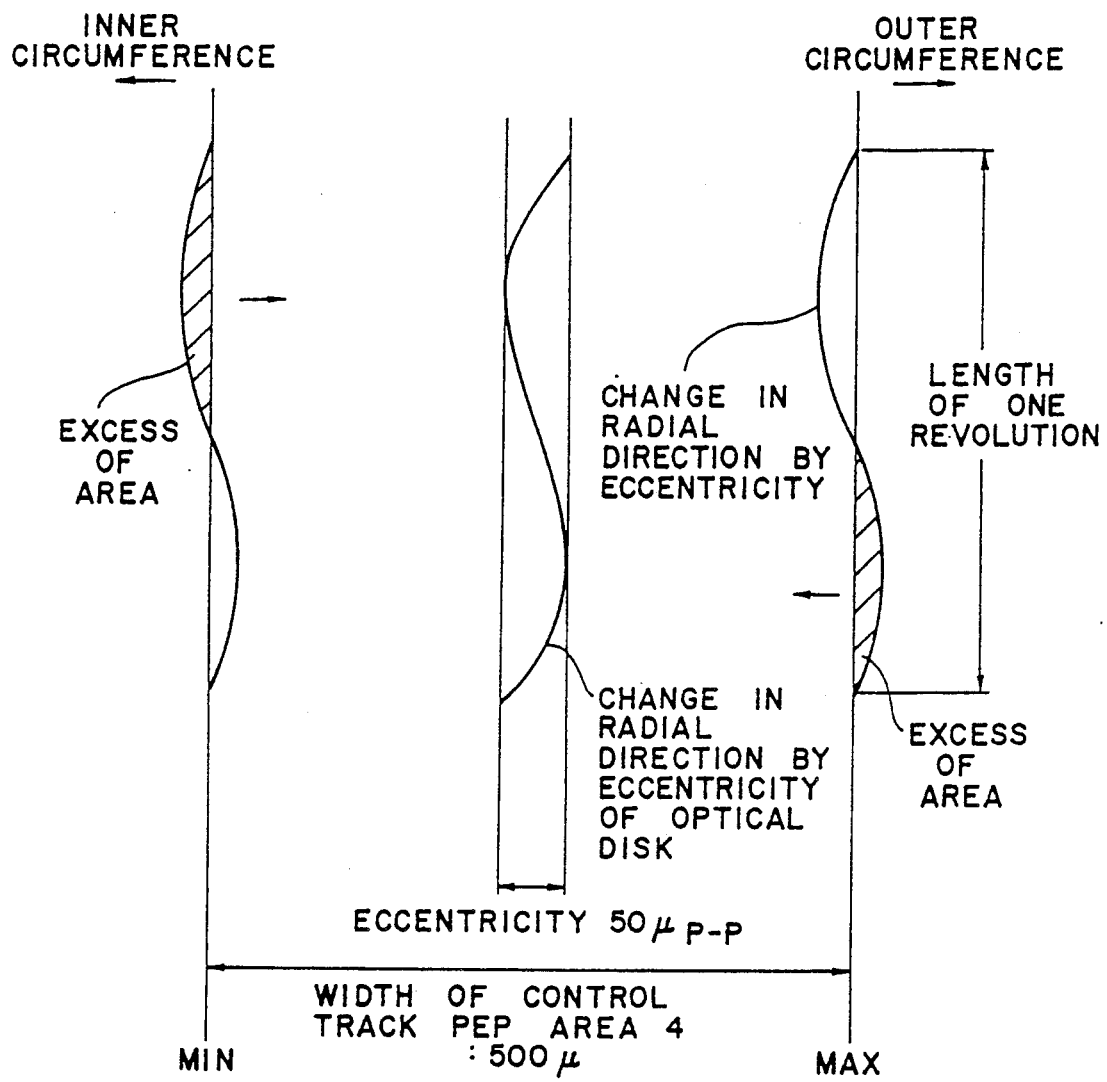
FIG. 2 is an explanatory view showing the relationship between changes in the read position by the eccentricity of the optical disk in the PEP area and the allowed value thereof.
Figure 3A:
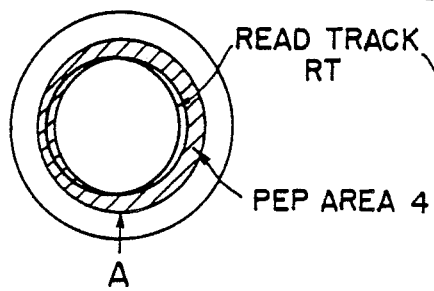
FIGS. 3A and 3B are waveform diagram of respective components for explaining the operation of the system shown in FIG. 1.
Figure 3B:
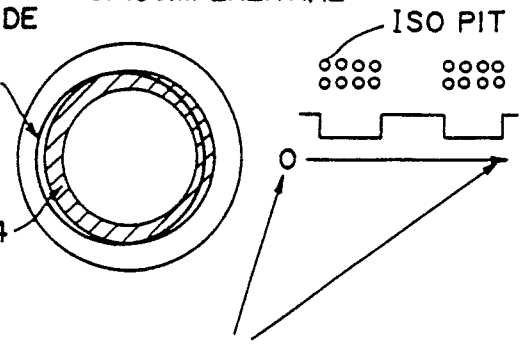

The operation of the arrangement stated above will now be described in accordance with the time chart shown in FIGS. 3A and 3B. More particularly, FIG. 3A shows the case that a missing portion of the signal reading track by the optical pick-up 18 is positioned on the inner circumferential side of the control track PEP area 4, and FIG. 3B shows the case that a missing portion of the signal reading track by the optical pick-up 18 is positioned on the outer circumferential side of the PEP area 4, wherein (a) to (j) represent signals a to j in FIG. 1, respectively, and (k) represents a missing portion in reading signals.

An output signal A from the sensor $D_1$ of the bisectional sensor 38 and an output signal B of the sensor $D_2$ thereof are added by an adder 40, and an added output is taken out as a read out signal a corresponding to read information. On the PEP area, the read out signal a is modulated by the pits of the disk such that its level is lowered at the pit portion. (see FIG. 3(a)) In order to recover the binary signal corresponding to the information, from the read out signal a it is required to set the threshold level corresponding to the level of that signal. For this reason, by the top level detector 44 and the bottom level detector 46, the top level detection signal c which correspond to a mean value of the maximum points of the levels of the read out signals a and the bottom level detection signal d which correspond to a mean value of the minimum points of the levels thereof are obtained. These signals are divided by the level setter 76. Thus, a level signal $V_M$ intermediate between both signals is provided and this signal $V_M$ is delivered to the first comparator 48. Namely, the threshold level is automatically set in correspondence with the level of the read out signal a. The readout signal a is binarized with the level signal $V_M$ being as a threshold at the first comparator 48. Thus, a phase modulated binary signal in the form of a first deviation signal e is provided. This binary signal e is delivered to the PE demodulation unit 56, at which phase demodulation is carried out. Thus, detection of data is conducted. Namely, clock signals 62, 63 and data signal 64 are obtained at the PE demodulation unit 56. The data signal 64 is transmitted, as shown in FIG. 4A, to the data error detection unit 70 of the control circuit 24a. On the other hand, the clock signal 63 from the PE demodulation unit 56 is delivered to the level sense unit 54. Thus, a level sense signal 60 indicating whether or not the demodulated signal is a signal corresponding to a complete circumference is provided. Namely, the level sense unit 54 serves to form the level sense signal 60 indicating the missing state of the readout signal. In this embodiment, continuity of the clock signal 63 is detected in the level sense unit 54. As far described, in the PE demodulation procedure, the clock is regenerated directly from the read out signal. Therefore, the lacking of the signal corresponds to the absence of the clock. The phase modulated signal has 177 bits per one sector. One revolution of the optical disk 2 corresponds to three sectors and three gaps are present between sectors. This gap is a no-signal area which corresponds to 11 bits and takes about 650 $\mu$sec at the time of rotational control of 1800 rpm. Accordingly, the level sense unit 54 is comprised of a mono-multivibrator of the re-triggerable type to detect any discontinuity of the clock signal 63 which is more than this gap length. The level sense signal 60 detected by the level sense unit 54 is input to the control unit 74 of the control circuit 24a as shown in FIG. 4A.

On the other hand, at the level setting unit 78, a signal of the level of 80 to 90% of the difference between the top level sense signal c and the bottom level sense signal d is set as a level signal $V_H$. At the level setting unit 80, a signal of the level of 10 to 20% of the difference between the top level detection signal c and the bottom level detection signal d is set as a level signal $V_L$. At the second comparator 50, level comparison having the level signal $V_H$ as a threshold level is made. At the third comparator 52, level comparison having the level signal $V_L$ as a threshold level is made. Thus, a second deviation signal f and a third deviation signal g are obtained as outputs from the comparators 50 and 52, respectively. Referring now more particularly to FIG. 3, when the optical pick-up is ill-positioned, the read track (RT) of the optical pick-up travels partially in no-signal area. Then, discontinuity of the read out signal occurs, as illustrated in FIG. 3(a). In such case, the second deviation signal f and the third deviation signal g differ from each other in their width, by reason that the threshold level of the comparator 50 differs from that of the comparator 52 (see FIG. 3(f), (g)). The second and third deviation signals f and g are input to the EX-OR circuit 58 and a difference component signal h is obtained (see FIG. 3(h)). It must be noted that the difference component signal h appears just when the read track (RT) traverses the boundary of the PEP area.

On the other hand, an output signal A from the sensor $D_1$ and an output signal B from the sensor $D_2$ are output from the bisectional sensor 38. When the bisectional sensor 38 is subjected to off-track, missing portions occur in respective output signals A and B. The timing of missing of the signal and the timing of occurrence of the signal vary in dependence upon the direction of the off-track. Accordingly, a polarity signal b is obtained by applying subtractive operation to both signals A and B at the subtracter 42. This polarity signal b is output as signals having different polarities from each other depending upon the directions of off-track at the moment of shift from the signal presence portion to the missing portion and at the moment of shift from the signal missing portion to the signal presence portion, respectively. In this respect, since an output signal A from the sensor $D_1$ and an output signal B from the sensor $D_2$ are substantially the same in other portions (during on track, during off track), an output from the subtracter 42 is a signal having a very low level to such an extent that crosstalk component appears irregularly. In this embodiment, when the reading track RT of the reading beam of the optical pick-up 18 shifts to the inner circumferential side of the PEP area 4, the polarity signal b becomes a signal of negative polarity as shown in FIG. 3A, while when it shifts to the outer circumferential side, that signal b becomes a signal of positive polarity as shown in FIG. 3B.

Accordingly, by a switch 68 controlled by the difference component signal h which is output from the Exclusive OR circuit 58, at the time point of the boundary between the signal presence area and the no signal area, the polarity signal b is applied to the sample-hold & level processing circuit to apply sample-hold processing to the PEP area boundary signal i which has passed through the switch 68 to conduct a polarity discrimination processing, thereby making it possible to provide a direction signal j indicating the direction of off-track.

As shown in FIG. 4A, the direction signal j thus obtained is input to the drive unit 72. Error checking of data such as CRC, etc. is applied to the data signal 64 at the data error detection unit 70. If no error is detected, read operation of the PEP area 4 is completed. On the other hand, when any error is detected as a result of CRC check, a control pulse F is transmitted through the drive unit 72 on the basis of the direction signal j by a control signal from the control unit 74 to which a level detection signal (partially missing clock) 60 is input, to thus make a fine adjustment of the tracking position. On the contrary, when there is no direction signal j, a control pulse F for making a fine adjustment in a predetermined direction is output. Thereafter, data signal 64 is input for a second time. After such a fine adjustment, data signal 64 and level sense signal 60 are checked. When it is confirmed that signal is securely read out, tracking control is stopped.

As stated above, in the read control of the PEP area 4, there is employed a control method to conduct a very small change in the tracking position using an error in the read data as a trigger, thus to carry out read operation for a second time. As a result, a control can be conducted such that the optical pick-up 18 is positioned in the PEP area 4. Further, since tracking control can be carried out from the no signal area to the PEP area 4, secure and stable read operation of signals in the PEP area 4 can be carried out.

Figure 4B:
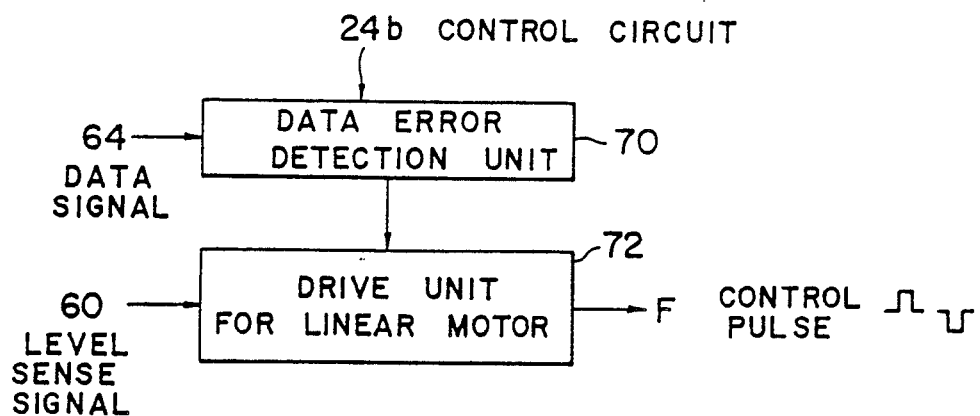
Figure 5A:
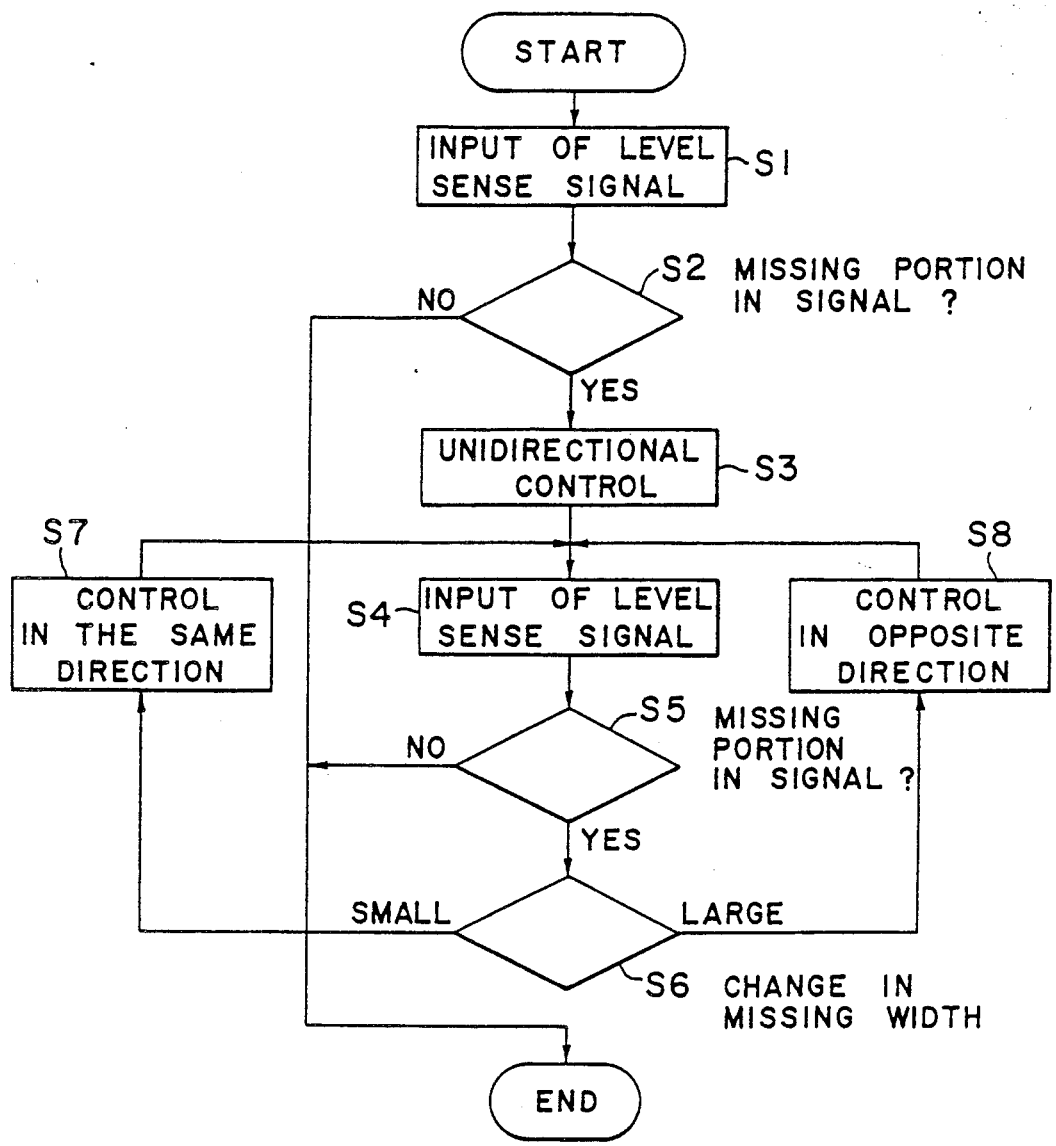
FIGS. 5A and 5B are flowchart and waveform showing the operation of an optical disk reading position control system of a second embodiment according to this invention.
Figure 5B:
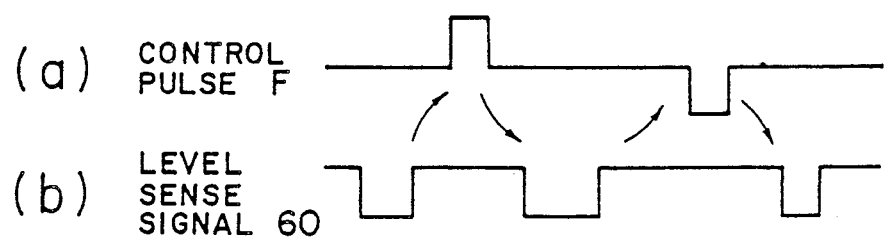
Figure 6:
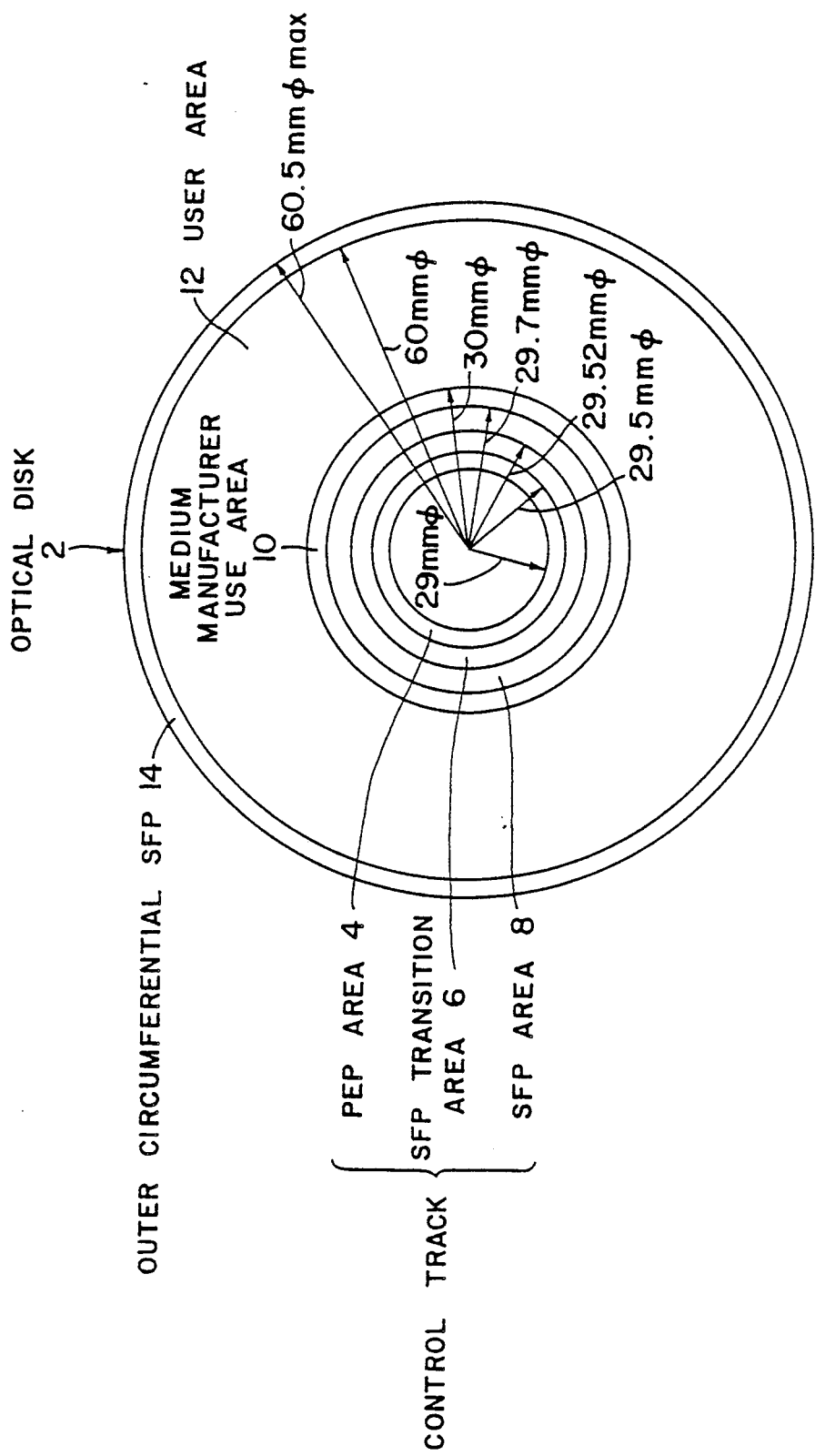
FIG. 6 is an explanatory view of an optical disk format in conformity with the ISO standard.

FIG. 5 is a flow chart of a read position control method according to a second embodiment of this invention. In this embodiment, a method is employed to use the level sense signal 60 and the control circuit 24b shown in FIG. 4B as the control circuit without using the direction signal j of FIG. 1, thus to make a correction of off-track at the time of reading the PEP area 4. As previously described, where the reading track of the PEP area 4 by the optical pick-up 18 comes off the PEP area 4, no signal area is produced. Thus, a level sense signal 60 having any signal missing portion is output from the level sense unit 54. This level sense signal 60 is input to a control circuit 24b composed of a data error detection unit 70 and a drive unit 72 as shown in FIG. 4B. The data error detection unit 70 carries out a check such as a CRC check, etc. on the basis of a signal derived from the data signal 64. When any error is detected at this unit, control of the limit area is conduced using the error detected signal as a trigger. In this case, control as indicated by the flowchart FIG. 5A and the time chart FIG. 5B is conducted. Initially, when a level sense signal 60 is input to the drive unit 72 at step S1, whether or not there is any missing portion in the signal is determined at the subsequent step S2. At this step, when the signal is judged to have no missing portions, control is completed on the basis of the judgment that there is no problem in tracking of the PEP area 4. In contrast, when it is judged that there is missing portion in the signal, the operation shifts to the next step S3 where a control in a certain direction is unconditionally conducted at first. Then, the operation shifts to step S4. Thus, a level sense signal subjected to control is input. Thereafter, a judgment as to whether or not the signal includes any missing portion is made for a second time at step S5. When the signal includes no missing portion, control is completed. In contrast, when the signal includes any missing portion, the operation proceeds to the step S6. If it is judged at step S6 that the width of the missing portion is small, the operation proceeds to step S7 where control in the same direction is conducted. In contrast, when it is judged that the width of the missing portion is large, the operation proceeds to step S8 where control in an opposite direction is conducted. As stated above, control is conducted until all missing portions in the signal are finally eliminated by the judgment at step S5. Namely, as result of such a control, if signal missing is eliminated at step S6, it is judged that a signal forming normal reading track is being read. Control is thus completed. The time chart shown in FIG. 5B illustrates the following operation in a sequential manner. First, a control pulse F is output from the drive unit 72 at step S3. Then, width of the missing portion in the level sense signal 60 is judged at step S6. As a result, since the width of the missing portion is judged to be widened, the operation proceeds to step S8. At this step, a control pulse F in an opposite direction is delivered. As a result, the width of the missing portion in the level sensor signal 60 becomes narrow.

The above-mentioned control is repeatedly carried out until no missing signal of the read out signal 60 is detected at step S5, thus making it possible to finally carry out normal tracking of the PEP area 4.

It is to be noted that while the above-described embodiments may be individually used, respectively, control under the state where respective embodiments are combined with each other may be conducted, thus making it possible to provide the same advantages as above.

What is claimed is:

1. An optical disk reading system comprising:
    means for rotating an optical disk having various tracks on which various data are written, said disk having, as one of said tracks, a control track on which control data for drive is written in accordance with a clock,
    optical pick-up means for irradiating a light toward an optical disk and receiving a reflected light corresponding to the information from said optical disk to convert said reflected light to an output electrical signal corresponding to said information,
    transfer means for transferring said optical pick-up means in a radial direction of said optical disk,
    detection means for detecting said various data and said clock from said electric signal of said optical pick-up means,
    error detection means for conducting an error detection of the data detected by said detection means,
    judgment means for judging whether or not the clock sensed by said detection means includes any missing portion caused by shifting of said optical pick-up means relative to said control track,
    shifting direction detection means for detecting a shifting direction signal indicative of the shifting direction when said optical pick-up means shifts relative to said control track, on the basis of said electrical signal of said optical pick-up means,
    control signal output means for applying, to said transfer means, a control signal to finely adjust said optical pick-up means in a direction opposite the shifting direction when an output from said error detection means indicates an error, an output from said judgment means indicates detection of said missing portion of clock, and a shifting direction signal is detected by said shifting direction detection means, and for applying, to said transfer means, a control signal to finely adjust said optical pick-up means in a predetermined direction when the output from said error detection means indicates an error, an output from said judgment means indicates detection of said missing portion, and no shifting direction signal is detected by said shifting direction detecting means; and
    said system repeating a reading operation when said output from said error detection means indicates an error and said output from said judgment means indicates detection of said missing portion of clock, and said system stopping reading operation when said output from said error detection means does not indicate an error and said output from said judgment means does not indicate detection of said missing portion of clock.

2. A system as set forth in claim 1, wherein said optical pick-up means is bisected along the tracks of said optical disk, and includes a first sensor and a second sensor for outputting electric signals, respectively.

3. A system as set forth in claim 2, wherein said shifting direction detection means includes a subtracter means for providing a difference signal between two electric signals output from said respective first and second sensors.

4. A system as set forth in claim 3, wherein said shifting direction detection means includes a sample-hold and level processing means for making a sample-hold of an output from said subtracter to carry out level processing.

5. A system as set forth in claim 4, wherein said shifting direction detection ,means includes switch means connected between said subtracter means and said sample-hold and level processing means.

6. A system as set forth in claim 5, wherein said shifting direction detection means includes switch control means for turning on the switch means only when scanning by the light from said optical pick-up means changes from one of scanning on said control track and scanning off said control track to the other.

7. A system as set forth in claim 6, wherein said switch control means includes a second comparator for making a comparison between a signal indicative of a sum of an output from said first sensor and an output from said second sensor and a second reference signal of which level is intermediate between a mean maximum level and a mean minimum level of said sum signal, a third comparator for making a comparison between said sum signal and a third reference signal of which the level is lower than said second reference signal and is intermediate between the mean maximum level and the mean minimum level of said sum signal, and EX-OR means for providing an exclusive logical sum of outputs from said second and third comparators.

8. A system as set forth in claim 1, wherein said detection means includes PE demodulation means.

9. A system as set forth in claim 8, wherein said detection means includes binarization means for binarizing the electric signal from said optical pick-up means to apply said binarized signal to said PE demodulation means.

10. A system as set forth in claim 9, wherein said binarization means includes a first comparator for making a comparison between a reference level which is in the middle of a mean maximum and a mean minimum of said electric signal from said optical pick-up means, and said electric signal.

11. A system as set forth in claim 10,
wherein said optical pick-up means includes a first sensor and a second sensor bisected by the line along said tracks of said optical disk and outputting electric signals, respectively, and
wherein said binarization means includes an adder means for adding respective outputs from said first and second sensors, top level detection means for detecting a means maximum level on the basis of an output from said adder means, bottom level detection means for detecting a means minimum level on the basis of the output from said top level detection means, and level setting means for providing a middle reference level on the basis of an output from said top level detection means and on output from said bottom level detection means.

12. A system as set forth in claim 1, wherein aid judgment means is a level sense means comprisinga monomultivibrator.

13. An optical disk reading system comprising:
means for rotating an optical disk, having various tracks on which various data are written, said disk having, as one of said tracks, a control track on which control data for drive is written in accordance with a clock,
optical pick-up means for irradiating a light toward an optical disk and receiving a reflected light corresponding to the information from said optical disk to convert said reflected light to an output electrical signal corresponding to said information,
transfer means for transferring said optical pick-up means in a radial direction of said optical disk,
detection means for detecting said various data and said clock from said electric signal of said optical pick-up means,
error detection means for conducting an error detection of the data sensed by said detecting means,
judgment means for judging whether or not the clock sensed by said detection means includes any missing portion caused by shifting of said optical pick-up means relative to said control track,
means for applying, to said transfer means, a control signal to finely adjust said optical pick-up means in the same direction as that in the previous state, when the output from said error detection means still indicates an error, an output from said judgment means still indicates detection of said missing portion of clock, and the width of said missing portion is narrowed,
means for applying, to said transfer means, a control signal to finely adjust said optical pick-up means in a direction opposite to that in the previous state, when the output from said error detection means still indicates an error, an output from said judgment means still indicates detection of said missing portion of clock, and the width of said missing portion is widened; and
said system repeating a reading operation when said output from said error detection means indicates an error and said output from said judgment means indicates detection of said missing portion of clock, and said system stopping reading operation when said output from said error detection means does not indicate an error and said output from said judgment means does not indicate detection of said missing portion of clock.

14. A system as set forth in claim 13, wherein said detection means includes PE demodulation means.

15. A system as set forth in claim 14, wherein said detection means includes binarization means for binarizing the electric signal from said optical pick-up means to apply said binarized signal to said PE demodulation means.

16. A system as set forth in claim 15, wherein said binarization means includes a first comparator for making a comparison between a reference level which is in the middle of a mean maximum level and a mean minimum level of said electric signal from said optical pick-up means, and said electric signal.

17. A system as set forth in claim 16, wherein said optical pick-up means includes a first sensor and a second sensor bisected by the line along said tracks of said optical disk and outputting electric signals, respectively, and
wherein said binarization means includes adder means for adding respective outputs from said second sensors, top level detection means for detecting said top means maximum level on the basis of an output from said adder means, bottom level detection means for detecting said mean minimum level on the basis of the output from said top level detection means, and level setting means for providing a middle reference level on the basis of an output from said top level detection means and an output from said bottom level detection means.

18. A system as set forth in claim 13, wherein said judgment means is level sense means comprised of a monomultivibrator.

* * * * *